(12) United States Patent
Liu et al.

(10) Patent No.: US 12,229,033 B2
(45) Date of Patent: Feb. 18, 2025

(54) METHOD, DEVICE, AND PROGRAM PRODUCT FOR MANAGING COMPUTING RESOURCE IN STORAGE SYSTEM

(71) Applicant: EMC IP Holding Company LLC, Hopkinton, MA (US)

(72) Inventors: Bing Liu, Tianjin (CN); Lingdong Weng, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 492 days.

(21) Appl. No.: 17/063,274

(22) Filed: Oct. 5, 2020

(65) Prior Publication Data
US 2022/0043732 A1    Feb. 10, 2022

(30) Foreign Application Priority Data

Aug. 7, 2020   (CN) .......................... 202010787951.3

(51) Int. Cl.
G06F 11/34    (2006.01)
G06F 3/06    (2006.01)
(Continued)

(52) U.S. Cl.
CPC ........ *G06F 11/3414* (2013.01); *G06F 3/0619* (2013.01); *G06F 3/0631* (2013.01);
(Continued)

(58) Field of Classification Search
CPC .... G06F 3/0619; G06F 3/0631; G06F 3/0659; G06F 3/0673; G06F 11/3414;
(Continued)

(56) References Cited

U.S. PATENT DOCUMENTS 9,804,909 B1 *   10/2017   Fang ................... G06F 11/0706
10,555,145 B1 *   2/2020   Siddiqui ............. H04L 41/0894
(Continued)

*Primary Examiner* — Chun Kuan Lee
(74) *Attorney, Agent, or Firm* — WOMBLE BOND DICKINSON (US) LLP

(57) ABSTRACT

The present disclosure relates to a method, a device, and a program product for managing a computing resource in a storage system. In one method, a processing request for processing a task using a computing resource is received. A length of time required for processing the task is acquired based on a usage state of the computing resource. A workload of the computing resource for processing a future data access request for the storage system within a future time period is determined based on a load model of the computing resource and a current workload of the computing resource. The load model describes an association relationship between a previous load and a subsequent load of the computing resource for processing a historical data access request for the storage system. A target time period matching the length of time is selected from the future time period based on the workload for processing the task. A corresponding device and a corresponding computer program product are provided. Available computing resources in the storage system can be fully utilized. By choosing a target time period with a relatively low workload, a task can be processed in a more efficient manner.

20 Claims, 10 Drawing Sheets

(51) Int. Cl.
*G06F 11/14* (2006.01)
*G06F 11/30* (2006.01)
*G06F 18/214* (2023.01)

(52) U.S. Cl.
CPC .......... *G06F 3/0659* (2013.01); *G06F 3/0673* (2013.01); *G06F 11/1451* (2013.01); *G06F 11/1461* (2013.01); *G06F 11/3034* (2013.01); *G06F 11/3419* (2013.01); *G06F 11/3433* (2013.01); *G06F 18/214* (2023.01)

(58) Field of Classification Search
CPC ............. G06F 11/1451; G06F 11/1461; G06F 11/3034; G06F 11/3419; G06F 11/3433; G06F 3/061; G06F 18/214; G06F 3/067; G06K 9/6256

USPC ............................................................ 710/6
See application file for complete search history.

(56) References Cited

U.S. PATENT DOCUMENTS

| | | | |
|---|---|---|---|
| 2014/0143869 A1* | 5/2014 | Pereira | G06F 21/564 726/23 |
| 2015/0032897 A1* | 1/2015 | Deshpande | H04L 43/045 709/226 |
| 2016/0224392 A1* | 8/2016 | Clarke | G06F 9/505 |
| 2019/0342379 A1* | 11/2019 | Shukla | G06F 16/258 |
| 2020/0393981 A1* | 12/2020 | Dutta | G06F 3/0634 |
| 2021/0049424 A1* | 2/2021 | Lin | H04L 43/04 |
| 2021/0184942 A1* | 6/2021 | Tootaghaj | H04L 41/16 |
| 2021/0224687 A1* | 7/2021 | Goldszmidt | G06K 9/6268 |

\* cited by examiner

METHOD, DEVICE, AND PROGRAM PRODUCT FOR MANAGING COMPUTING RESOURCE IN STORAGE SYSTEM

CROSS-REFERENCE TO RELATED APPLICATION

This patent application claims priority, under 35 U.S.C. § 119, of Chinese Patent Application No. 202010787951.3, filed Aug. 7, 2020, which is incorporated by reference in its entirety.

TECHNICAL FIELD

Implementations of the present disclosure relate to management of computing resources, and more particularly, to a method, a device, and a computer program product for managing a computing resource in a storage system so as to process a task.

BACKGROUND

With the development of storage systems, a storage system has been able to process various data access requests from application systems. A storage system includes computing resources for processing data access requests. Generally speaking, in order to meet possible data access peaks, the processing capability of the computing resources is redundant. At present, technical solutions have been proposed to process tasks other than data access requests based on redundant computing capabilities in the storage system. However, the workload of the computing resources of the storage system fluctuates with changes in data access requests, which causes assigned tasks sometimes not to be executed in time. At this moment, how to improve a utilization rate of the computing resources in the storage system to ensure smooth execution of tasks has become a research hotspot.

SUMMARY OF THE INVENTION

Therefore, it is desirable to develop and implement a technical solution for managing a computing resource in a processing system in a more effective manner. It is desirable that the technical solution can be compatible with existing storage systems, and can manage computing resources in a storage system in a more effective manner by modifying various configurations of existing storage systems.

According to a first aspect of the present disclosure, a method for managing a computing resource in a storage system is provided. In this method, a processing request for processing a task using the computing resource is received. A length of time required for processing the task is acquired based on a usage state of the computing resource. A workload of the computing resource for processing a future data access request for the storage system within a future time period is determined based on a load model of the computing resource and a current workload of the computing resource. The load model describes an association relationship between a previous load and a subsequent load of the computing resource for processing a historical data access request for the storage system. A target time period matching the length of time is selected from the future time period based on the workload for processing the task.

According to a second aspect of the present disclosure, an electronic device is provided. The electronic device includes: at least one processor; a volatile memory; and a memory coupled to the at least one processor. The memory has instructions stored therein. When executed by the at least one processor, the instructions cause the device to execute actions for managing a computing resource in a storage system. The actions include: receiving a processing request for processing a task using a computing resource; acquiring, based on a usage state of the computing resource, a length of time required for processing the task; determining, based on a load model of the computing resource and a current workload of the computing resource, a workload of the computing resource for processing a future data access request for the storage system within a future time period, the load model describing an association relationship between a previous load and a subsequent load of the computing resource for processing a historical data access request for the storage system; and selecting, based on the workload, a target time period matching the length of time from the future time period for processing the task.

According to a third aspect of the present disclosure, a computer program product is provided. The computer program product is tangibly stored on a non-transitory computer-readable medium and includes machine-executable instructions that are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings.

DETAILED DESCRIPTION

Hereinafter, preferred implementations of the present disclosure will be described in more detail with reference to the accompanying drawings. Although preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

As used herein, the term "include" and variations thereof mean open-ended inclusion, that is, "including but not limited to." Unless specifically stated, the term "or" indicates "and/or." The term "based on" means "based at least in part on." The terms "one example implementation" and "one implementation" mean "at least one example implementation." The term "another implementation" means "at least one further implementation." The terms "first," "second," etc. may refer to different or the same objects. Other explicit and implicit definitions may also be included below.

Figure 1:
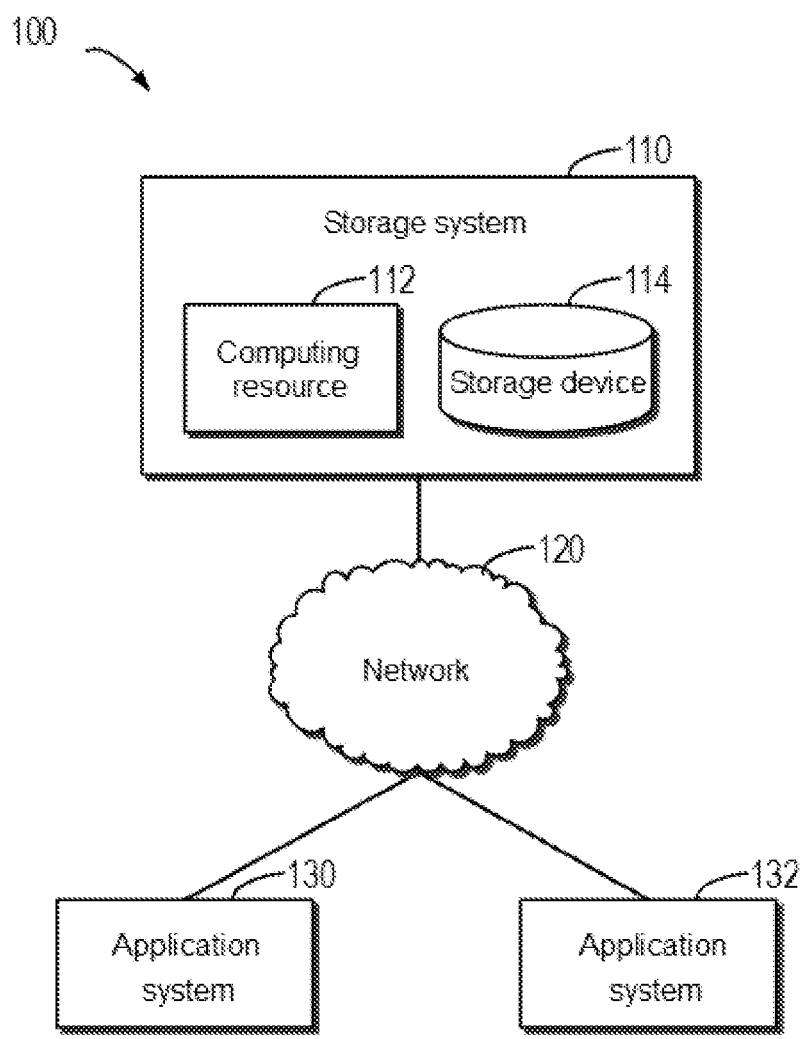
FIG. 1 schematically shows a block diagram of an application environment in which an example implementation of the present disclosure may be implemented.

FIG. 1 schematically shows block diagram 100 of an application environment in which an example implementation of the present disclosure may be implemented. As shown in FIG. 1, storage system 110 may be connected to application system 130, . . . , and application system 132 via network 120. Here, application system 130, . . . , and application system 132 may be application systems for providing a variety of services to users. Application system 130 and the like may respectively generate a backup of a certain data object at a plurality of time points during operation, and perform the backup to storage system 110. For example, application system 130 may include a banking system that provides financial services, and application system 130 may back up current account information to storage system 110 every night. For another example, application system 132 may include a management system that provides office services, and application system 132 may back up work data of each employee to storage system 110 every weekend.

As shown in FIG. 1, storage system 110 may include computing resource 112 and storage device 114. Here, computing resource 112 may be used to serve data access requests from various application systems 130, . . . , 132. For example, computing resource 112 may receive a backup request from application system 130 and back up received data to storage device 114. Computing resource 112 may receive a recovery request from application system 130, retrieve specified data from storage device 114, and send the data to application system 130. It will be understood that the above data access request will occupy a certain number of computing resources 112. Generally speaking, in order to process sudden data access requests, computing resource 112 in storage system 110 may be redundant. At this moment, when the number of data access requests received by storage system 110 is small, computing resource 112 will be idle.

At present, a technical solution for reusing computing resource 112 in storage system 110 has been proposed. A workload of computing resource 112 may be monitored. When the workload is found to be low, computing resource 112 may be assigned with other tasks. However, task processing will take a certain amount of time, and while computing resource 112 is processing a task, storage system 110 may receive a large number of data access requests. This leads to a sudden increase in the workload of computing resource 112, which in turn makes both the data access requests and the task not be processed in time, and even makes storage system 110 crash.

In order to solve the above defects, implementations of the present disclosure provide a method, a device, and a computer program product for managing a computing resource in a storage system. According to an example implementation of the present disclosure, it is proposed to establish a load model for the workload of computing resource 112. Here, the load model may describe an association relationship between a previous load and a subsequent load of computing resource 112 for processing a historical data access request for storage system 110. Further, the workload of computing resource 112 within a period of time in the future may be determined based on a current load of the computing resource and the load model. It is assumed that a current workload of computing resource 112 (for example, in the past 3 hours or another time period) is high and the load model shows that the workload will be low after the next 4 hours. At this moment, the computing resource may be instructed to execute tasks after the next 4 hours.

Figure 2:
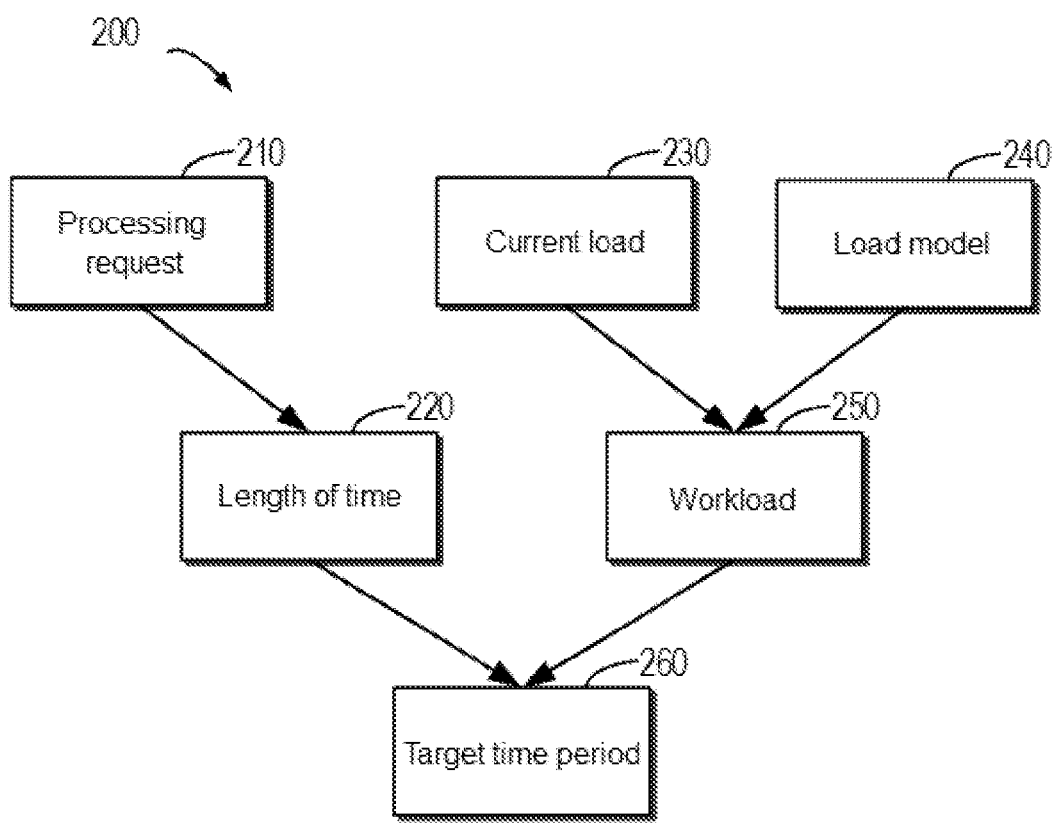
FIG. 2 schematically shows a block diagram of a process for managing a computing resource in a storage system according to an example implementation of the present disclosure.

Hereinafter, more details of the present disclosure will be described with reference to FIG. 2. FIG. 2 schematically shows block diagram 200 of a process for managing a computing resource in a storage system according to an example implementation of the present disclosure. As shown in FIG. 2, processing request 210 for processing a task using computing resource 112 may be received, and length of time 220 (assuming that length of time 220 is 1 hour) required for processing the task may be determined. Further, current load 230 of computing resource 112 may be determined, and workload 250 of computing resource 112 within a future time period may be determined using the current load and load model 240.

It will be understood that workload 250 here is associated with time in the future. According to an example implementation of the present disclosure, when the workload is represented by a usage rate of a central processing unit (CPU), workload 250 may be represented as follows: the workload in the 1st hour in the future is 12%, the workload in the 2nd hour in the future is 20%, the workload in the 3rd hour in the future is 50%, and the like. At this moment, the received task may be processed in the 1st hour in the future when the workload is low. With an example implementation of the present disclosure, the historical experience in load model 240 may be fully utilized to determine workload 250 of computing resource 112 in the future. In this way, suitable future time period 260 may be selected to execute a task, and it may be ensured that computing resource 112 will not be disturbed by a data access request during execution of the task.

Figure 3:
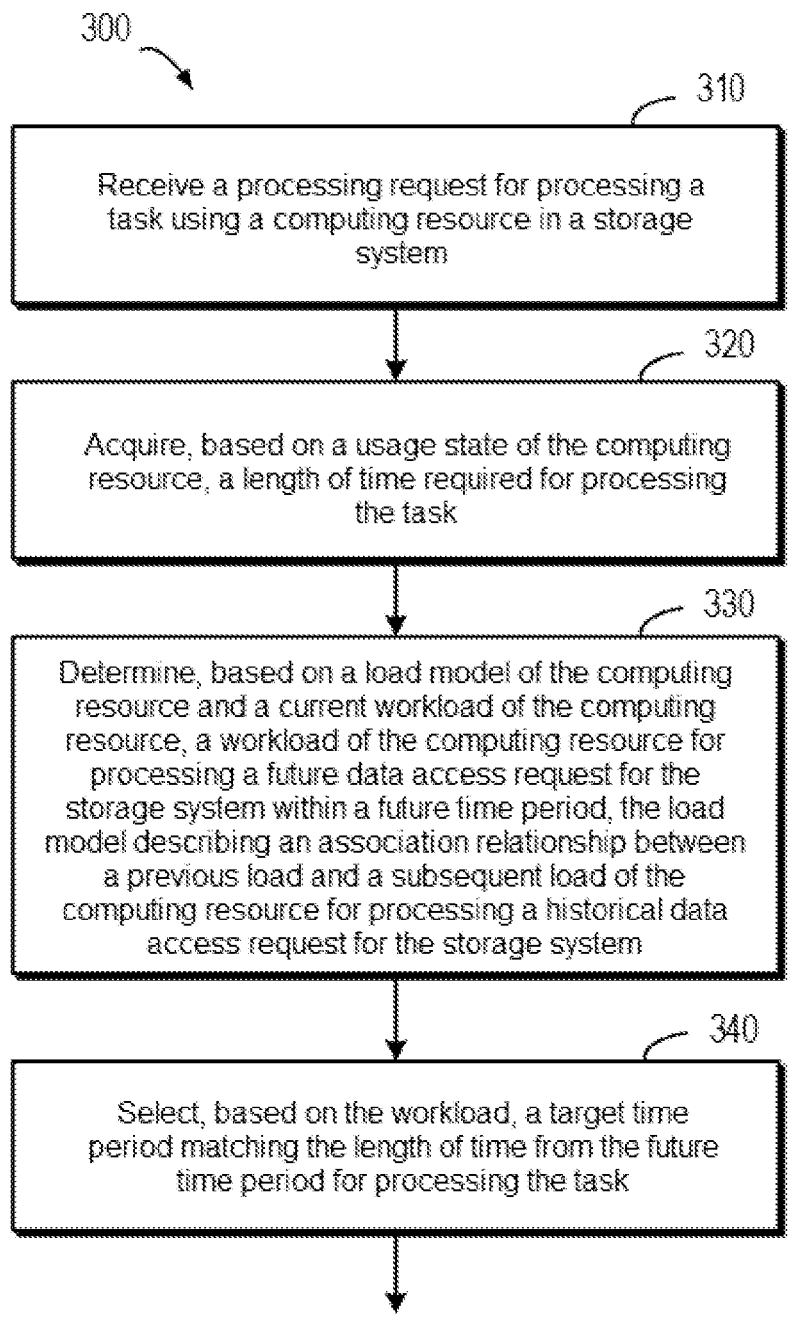
FIG. 3 schematically shows a flowchart of a method for managing a computing resource in a storage system according to an example implementation of the present disclosure.

Hereinafter, more details about how to manage computing resource 112 in storage system 110 will be described with reference to FIG. 3. FIG. 3 schematically shows a flowchart of method 300 for managing a computing resource in a storage system according to an example implementation of the present disclosure.

At block 310, a processing request for processing a task using a computing resource in a storage system is received. Here, the storage system may include a backup system. It will be understood that the backup system usually works as a secondary storage system in the background of an application system. Computing resource 112 in the backup system may have idle computing capabilities. With an example implementation of the present disclosure, idle computing resources of the backup system may be fully used, thereby increasing the resource utilization rate.

At block 320, a length of time required for processing the task is determined based on a usage state of the computing resource. According to an example implementation of the present disclosure, the required length of time may be determined in various ways. Generally speaking, an amount of computation required for the task may be defined in a task description, and thus the required length of time may be determined based on an overall average usage state of the computing resource. According to an example implementation of the present disclosure, the required length of time may be determined based on an average usage state of the computing resource in the past specified time period. For example, if it is found that the usage state of the computing resource fluctuates periodically, a time period for determining an average usage state may be specified according to the position of the current time in one cycle. For example, it is assumed that the usage state is found to fluctuate on a weekly basis: the workload is low from Monday to Friday, and the workload is high on Saturday and Sunday. It is assumed that it is currently Monday, and at this moment, an average usage state of the computing resource may be determined based on a usage state from Monday to Wednesday. In this way, the length of time required for processing the task may be estimated as accurately as possible.

At block 330, workload 250 of the computing resource for processing a future data access request for the storage system within a future time period is determined based on load model 240 of the computing resource and current workload 230 of the computing resource. It will be understood that when the task is processed by a computing resource of the storage system, the computing resource still needs to process a data access request in the storage system. Therefore, it is possible to choose to process the task in a time period when the number of computing resources occupied by the data access request is low.

Figure 4:
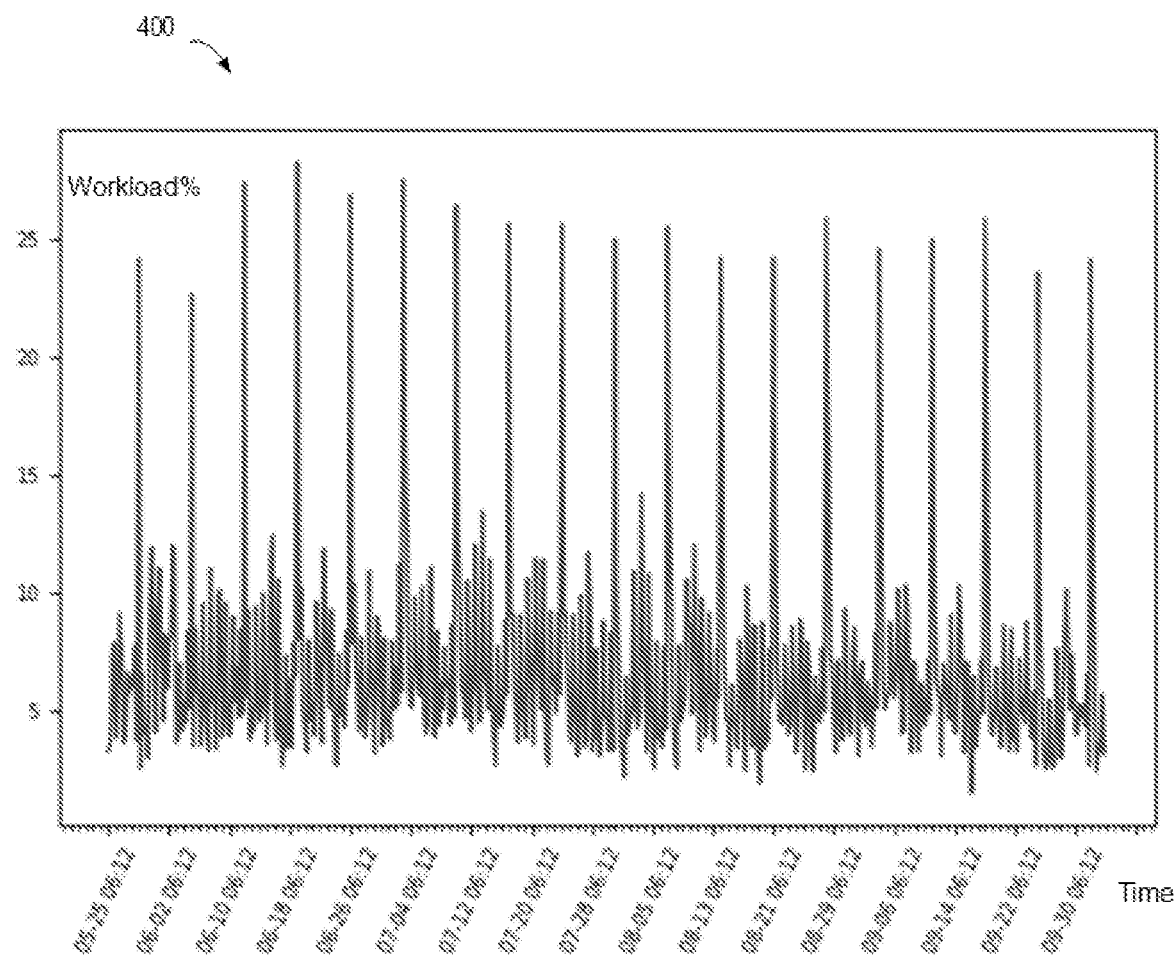
FIG. 4 schematically shows a block diagram of a historical workload according to an example implementation of the present disclosure.

Here, load model 240 describes an association relationship between a previous load and a subsequent load of the computing resource for processing a historical data access request for the storage system. Load model 240 may be acquired based on a machine learning technology. Specifically, a historical load sequence of the computing resource within a historical time period may be acquired, and load model 240 may be trained based on the historical load sequence. FIG. 4 schematically shows block diagram 400 of a historical workload according to an example implementation of the present disclosure. In FIG. 4, the horizontal axis represents time and the vertical axis represents a historical workload of a computing resource. A predetermined time interval may be specified, and a workload of a computing system may be collected at the predetermined time interval. FIG. 4 schematically shows a workload collected at a 6-hour interval from May 25, 2019 to Sep. 30, 2019. In other example implementations, the time interval may be set to other values.

With an example implementation of the present disclosure, an association relationship between a previous load and a subsequent load may be acquired based on different time points in a historical workload. Since the historical load sequence is a workload that has already occurred, training load model 240 based on the historical load sequence may make full use of the known historical knowledge of the computing resource, thereby making the trained load model more accurate.

According to an example implementation of the present disclosure, load model 240 may be generated based on a workload at p hours before a certain time point in the past and a workload at q hours after the time point. Here, the values of p and q may be customized. With the generated load model 240, a future workload prediction may be obtained based on a workload model before a current time point. Load model 240 may be trained using a historical workload as shown in FIG. 4. Specifically, a plurality of historical load segments describing a previous load and a plurality of future load segments describing a subsequent load may be selected from the historical load sequence.

First, how to select a plurality of historical load segments from the historical load sequence is described. In the historical load sequence, a historical load segment and a future load segment may be selected based on a certain historical time point. Here, the future load segment follows the historical load segment. Referring to FIG. 4, for a time point of 06:12 on June 2nd, workloads at p hours before the time point and q hours after the time point may be selected as the historical load fragment and the future load fragment, respectively. According to an example implementation of the present disclosure, the values of p and q may be set according to requirements of a specific application environment. For example, data within 24 hours before the time point may be selected as the historical load segment, and data within 12 hours after the time point may be selected as the future load segment.

In the historical load sequence, 06:12 every day may be used as a reference time point to select the corresponding historical load segment. According to an example implementation of the present disclosure, a length of the historical load segment may be specified. For example, the length may be specified as a few hours, half a day, or even longer. The length may be specified based on changes in the workload of the computing resource in the storage system. If the workload changes drastically, a relatively long length of time may be specified; if the workload changes slowly, a relatively short length of time may be specified. In this way, a corresponding length of time may be specified according to the specific application environment of the storage system, so that load model 240 obtained by training may more accurately reflect the association relationship between the previous load and the subsequent load.

According to an example implementation of the present disclosure, 06:12 every day may be used as a reference time point to select the corresponding future load segment. In this way, a plurality of future load segments respectively corresponding to a plurality of historical load segments may be determined. Here, the plurality of future load segments respectively follow the plurality of historical load segments. The future load segment corresponding to the historical load segment may be determined based on a predetermined length of the future load segment. It will be understood that the historical load fragment and the future load fragment here may have the same or different lengths (i.e., p and q may have the same or different values).

Figure 5:
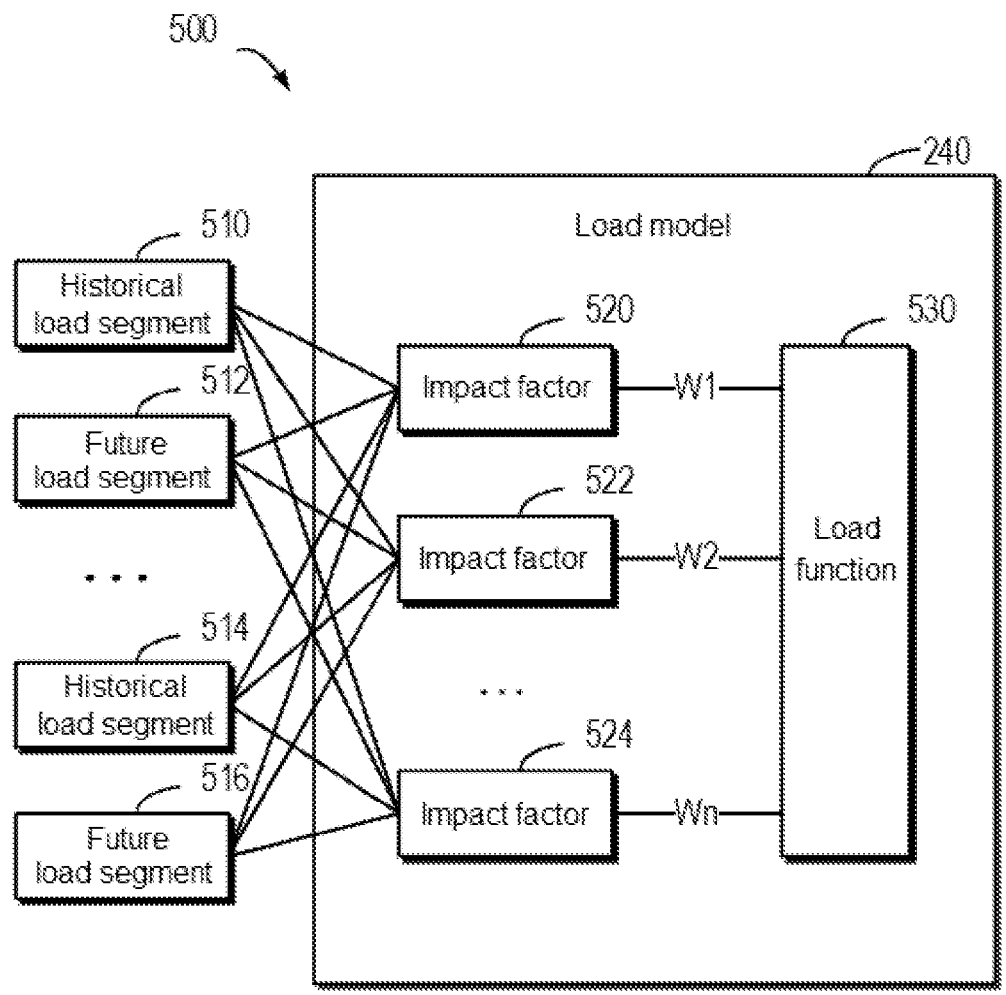
FIG. 5 schematically shows a block diagram of a process for establishing a load model according to an example implementation of the present disclosure.

According to an example implementation of the present disclosure, the load model may be trained based on a training data set including a plurality of historical load fragments and a plurality of future load fragments, so that a predicted value of a future load obtained based on the historical load fragment and the trained load model is consistent with the future load fragment. In the case where the training data set has been obtained, the load model may be trained based on training data in the training data set. FIG. 5 schematically shows block diagram 500 of a process for establishing a load model according to an example implementation of the present disclosure. As shown in FIG. 5, a piece of training data may include historical load segment 510 and future load segment 512, . . . , and a piece of training data may include historical load segment 514 and future load segment 516.

According to an example implementation of the present disclosure, other information may also be added to the training data. For example, the collection time and collection date of each load segment, which day of one week, whether it is a holiday, and other parameters may be added to the training data to obtain a periodic change trend of the workload. According to an example implementation of the present disclosure, each piece of training data may be represented in a vector manner.

According to an example implementation of the present disclosure, in order to acquire load model 240, a plurality of impact factors 520, 522, . . . , and 524 may be set. Each impact factor may represent the impact of the training data on one aspect of load model 240, and a corresponding weight may be set for each impact factor. For example, a weight may be set for impact factor $520w_1$, a weight may be set for impact factor $522w_2$, . . . , a weight may be set for impact factor $524W_m$, and the like.

Load function 530 may be constructed based on a machine learning technology. It is desirable that load function 530 may describe an association relationship between a plurality of historical load segments 510, . . . , and 514 and corresponding future load segments 512, . . . , and 516. After training load model 240 with the training data set, when the plurality of historical load segments 510, . . . , and 514 are respectively input into load model 240, future loads determined by load model 240 may be as consistent as possible with future load segments 512, . . . , and 516.

For example, it is assumed that formula 1 and formula 2 are respectively used to represent an impact factor (where $x_i$ represents an ith impact factor) and a corresponding weight (where $w_i$ represents the weight of the ith impact factor), where the integer m represents the number of impact factors. At this moment, a vector $X^T$ represents a group of impact factors, and a vector $W^T$ represents a corresponding weight.

$$X^T = [x_1\ x_2 \ldots x_m]$$ Formula 1

$$W^T = [w_1\ w_2 \ldots w_m]$$ Formula 2

Load function 530 may be represented by the following formula 3, where y represents a load function and b represents a constant.

$$y = b + w_1 \times x_1 + w_2 \times x_2 + \ldots + w_m \times x_m = b + \sum_{k=1}^{m} w_k \times x_k$$ Formula 3

According to an example implementation of the present disclosure, a cost function may be set. For example, the cost function may be set based on a difference between a predicted value and a measured value of a future load R. According to an example implementation of the present disclosure, the cost function may be set based on the following formula 4 R:

$$R^2 = 1 - \frac{\sum_{i=1}^{n}(\hat{y}^{(i)} - y^{(i)})}{\sum_{i=1}^{n}(\bar{y} - y^{(i)})}$$ Formula 4 where R represents a cost function, n represents the quantity of training data, $\hat{y}^{(i)}$ represents a predicted value of the ith future load, $y^{(i)}$ represents a measured value of the ith future load, and $\bar{y}$ represents an average of measured values of future loads.

The collected training data may be used to iteratively train load model 240 based on the formulas described above until the cost function R meets a predetermined condition. The predetermined condition may include, for example, reaching a predetermined number of iterations, the value of the cost function reaching a specified range (for example, a range of 1±0.001), and the like. It will be understood that principles involved in training load model 240 are generally described above only with reference to formulas 1-4. The above formulas 1-4 are only schematic. According to an example implementation of the present disclosure, other formulas may be used. In the context of the present disclosure, there is no restriction on how to train load model 240. Instead, load model 240 may be acquired based on various training technologies that have been developed so far and/or will be developed in the future.

How to acquire load model 240 has been described above. In the case where load model 240 has been obtained, a workload of the computing resource for processing a future data access request for the storage system within a future time period may be determined based on load model 240 and a current workload of the computing resource. The current workload here may be a workload at p hours before a current time point. Based on load model 240, a workload at q hours after the current time point may be obtained.

Figure 6:
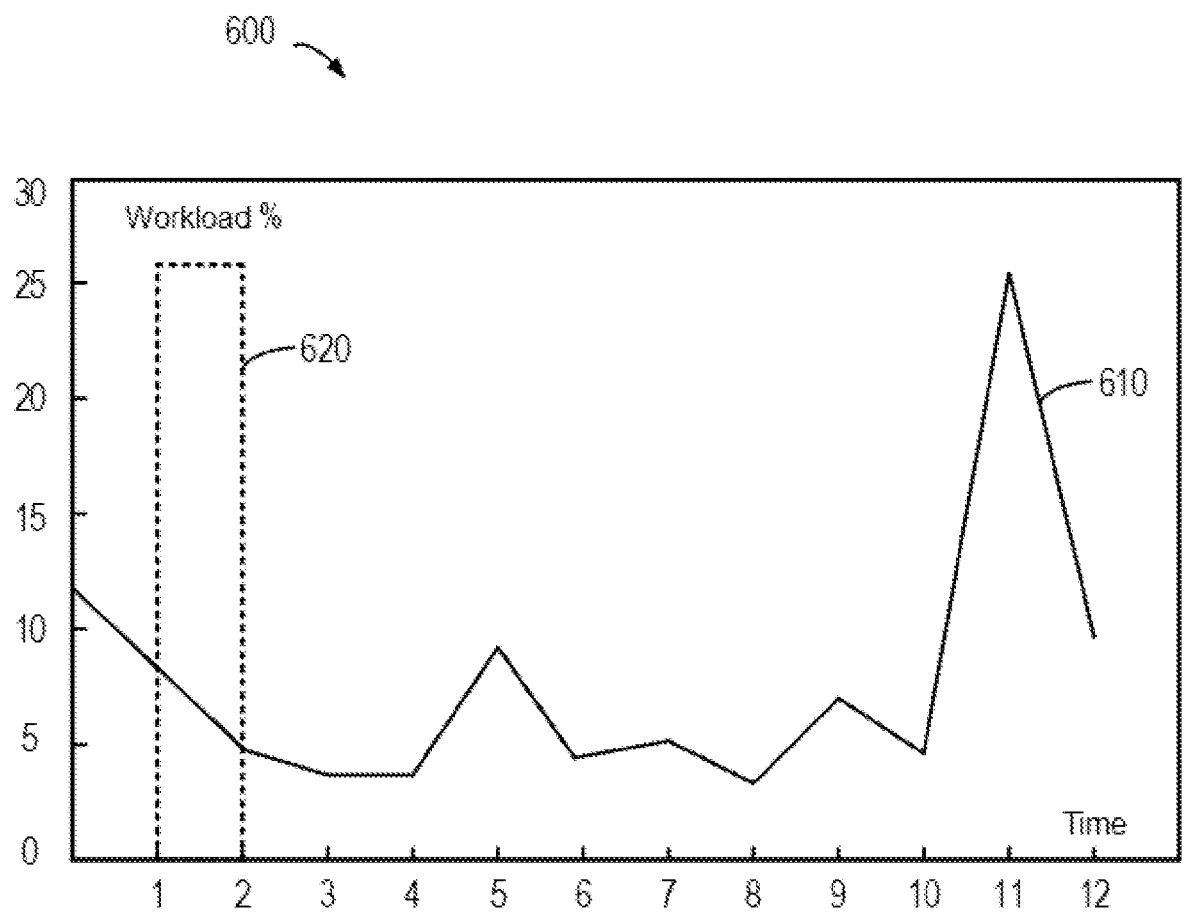
FIG. 6 schematically shows a block diagram of a workload curve of a computing resource in a storage system according to an example implementation of the present disclosure.

Hereinafter, how to determine target time period 260 will be described by returning to FIG. 3. At block 340 of FIG. 3, target time period 260 matching length of time 220 is selected from the future time period based on workload 250 for processing the task. According to an example implementation of the present disclosure, a workload curve describing an association relationship between the workload and a time point in the future time period may be generated. FIG. 6 schematically shows block diagram 600 of a workload curve of a computing resource in a storage system according to an example implementation of the present disclosure. In FIG. 6, the horizontal axis represents time and the vertical axis represents a workload, and the figure shows workload curve 610 in the next 12 hours. Based on workload curve 610, a time period with a relatively low workload may be selected from a future time period as a target time period.

The ordinate in FIG. 6 represents the workload, so a part of the workload curve that is as close to the abscissa as possible may be selected as much as possible. According to an example implementation of the present disclosure, a sliding window may be established based on the determined length of time, and the sliding window may be moved along the horizontal axis. Assuming that the determined length of time required for processing the task is 1 hour, sliding window 620 with a width of 1 may be set. During the movement of sliding window 620, the target time period may be selected from the future time period based on workload curve 610 and sliding window 620.

Figure 7A:
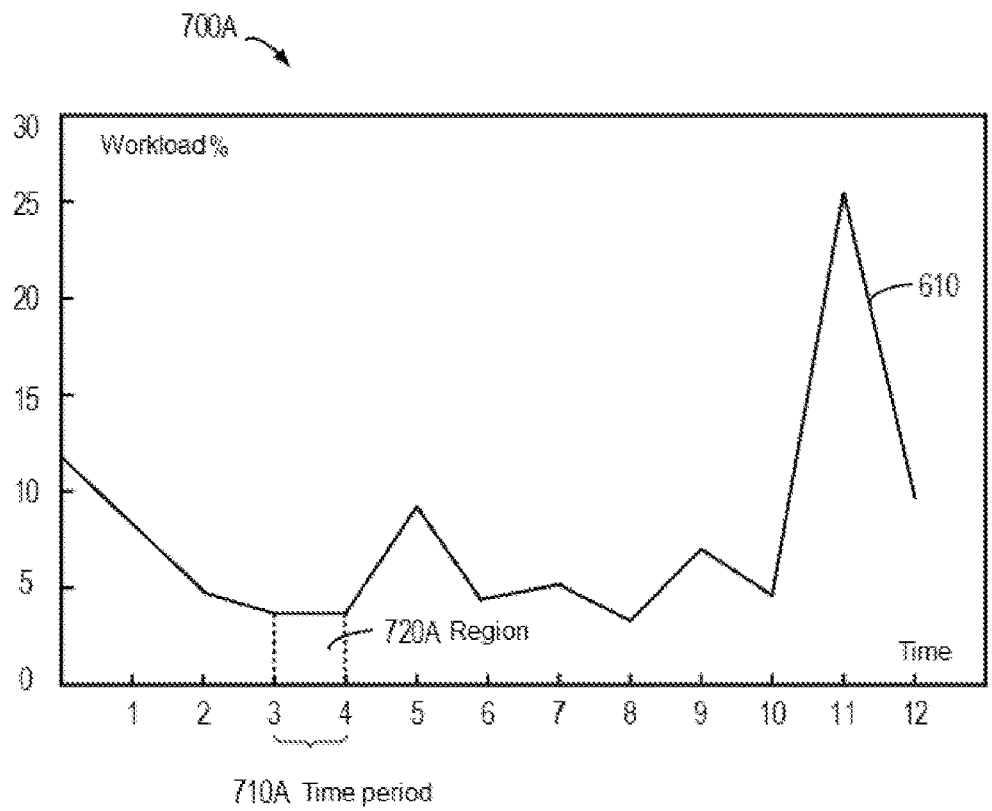
FIGS. 7A and 7B schematically show block diagrams of selecting a target time period according to an example implementation of the present disclosure respectively.
Figure 7B:
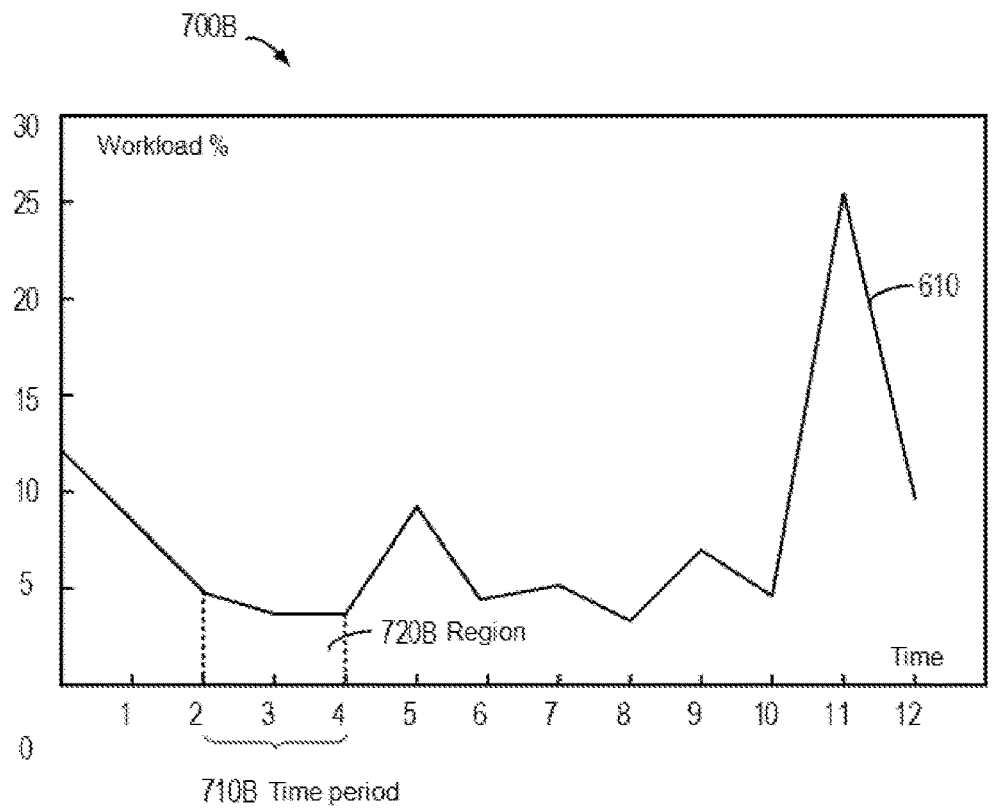

Specifically, a region between workload curve 610 and the time axis within sliding window 620 may be determined. Then, the target time period may be determined based on a size of the region. FIGS. 7A and 7B schematically show block diagrams 700A and 700B of selecting a target time period according to an example implementation of the present disclosure respectively. As shown in FIG. 7A, the length of time is 1 hour, and a sliding window with a width of 1 hour may be set. During the movement of the sliding window, it may be determined that region 720A is minimum, and thus time period 710A (the 3rd hour to the 4th hour) corresponding to region 720A may be determined as the target time period. Then, the computing resource may be instructed to process the task from the 3rd hour to the 4th hour in the future.

As shown in FIG. 7B, assuming that the length of time is 2 hours at this moment, a sliding window with a width of 2 hours may be set. During the movement of the sliding window, it may be determined that region 720B is minimum, and thus time period 710B (the 2nd hour to the 4th hour) corresponding to region 720B may be determined as the target time period. Then, the computing resource may be instructed to process the task from the 2nd hour to the 4th hour in the future.

Figure 8:
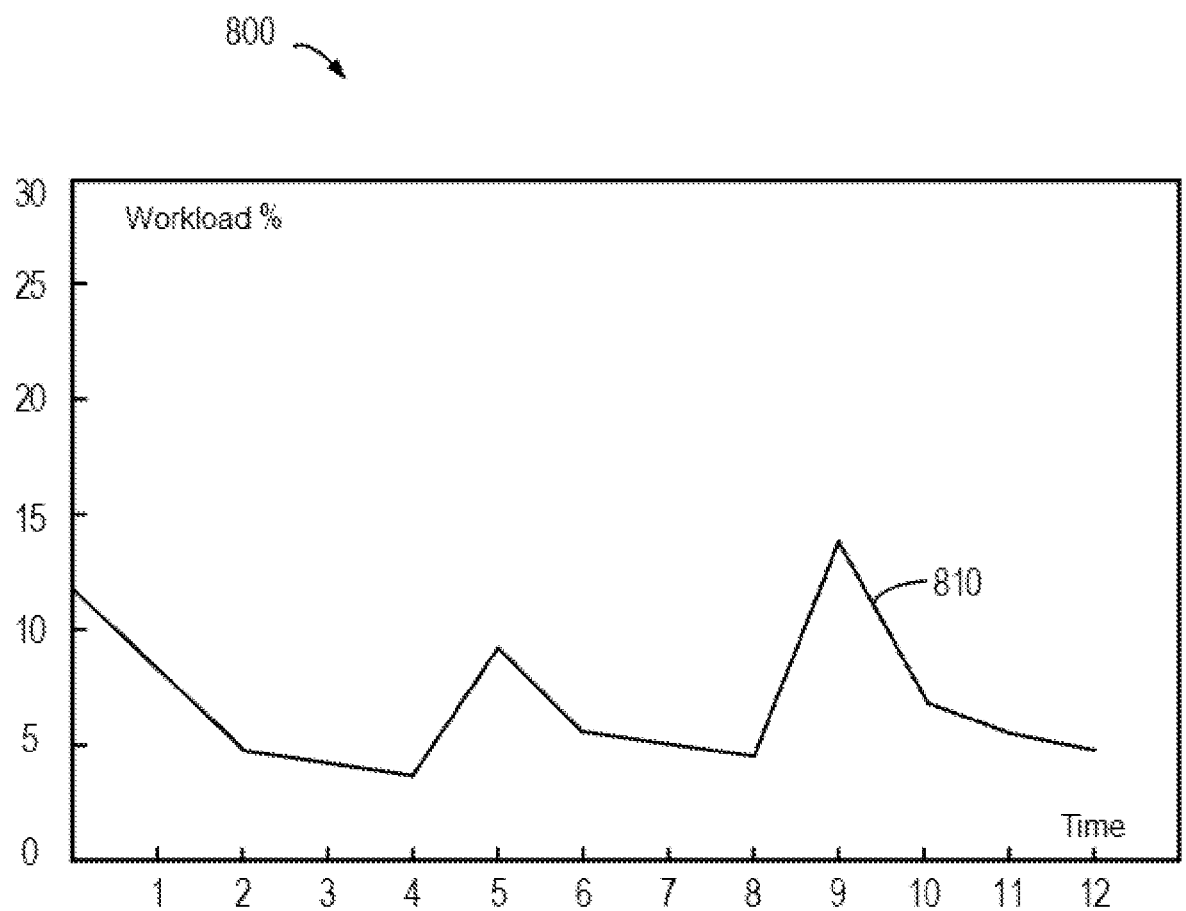
FIG. 8 schematically shows a block diagram of another workload curve of a computing resource in a storage system according to an example implementation of the present disclosure.
Figure 9A:
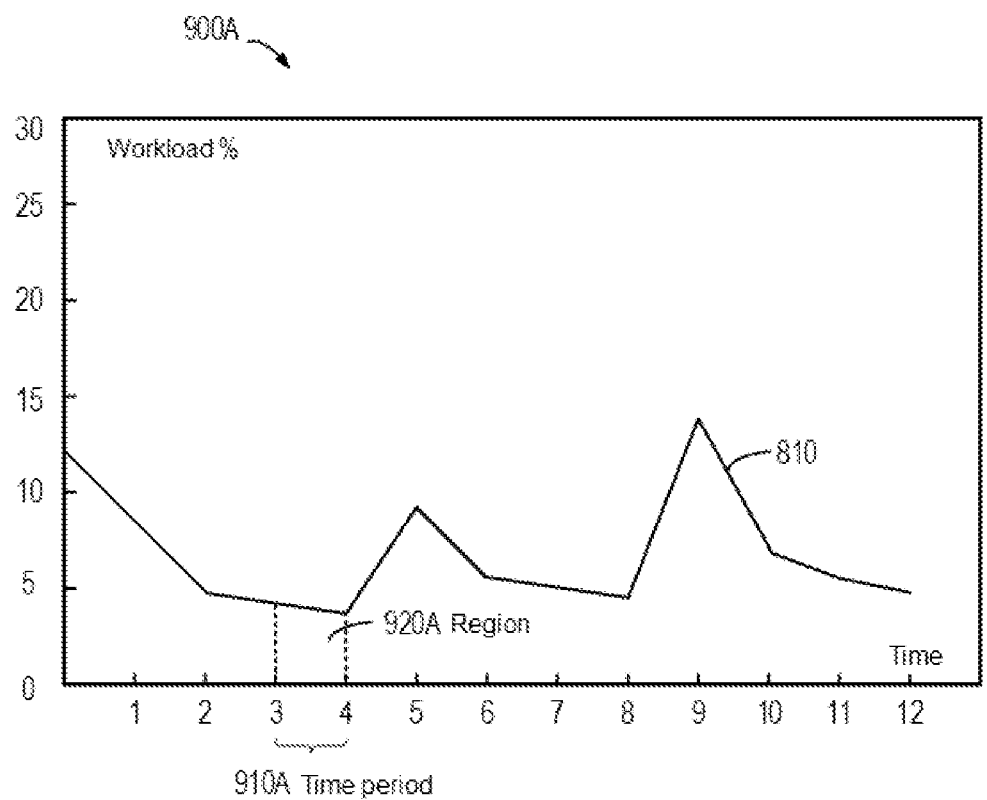
FIGS. 9A and 9B schematically show block diagrams of selecting a target time period according to an example implementation of the present disclosure respectively.

Hereinafter, more examples of determining the target time period will be described with reference to FIGS. 8, 9A, and 9B. FIG. 8 schematically shows block diagram 800 of another workload curve 810 of a computing resource in a storage system according to an example implementation of the present disclosure. In FIG. 8, the horizontal axis represents time and the vertical axis represents a workload. FIG. 9A schematically shows block diagram 900A of selecting a target time period according to an example implementation of the present disclosure. As shown in FIG. 9A, the length of time is 1 hour, and a sliding window with a width of 1 hour may be set. During the movement of the sliding window, it may be determined that region 920A is minimum, and thus time period 910A (the 3rd hour to the 4th hour) corresponding to region 920A may be determined as the target time period. Then, the computing resource may be instructed to process the task from the 3rd hour to the 4th hour in the future.

Figure 9B:
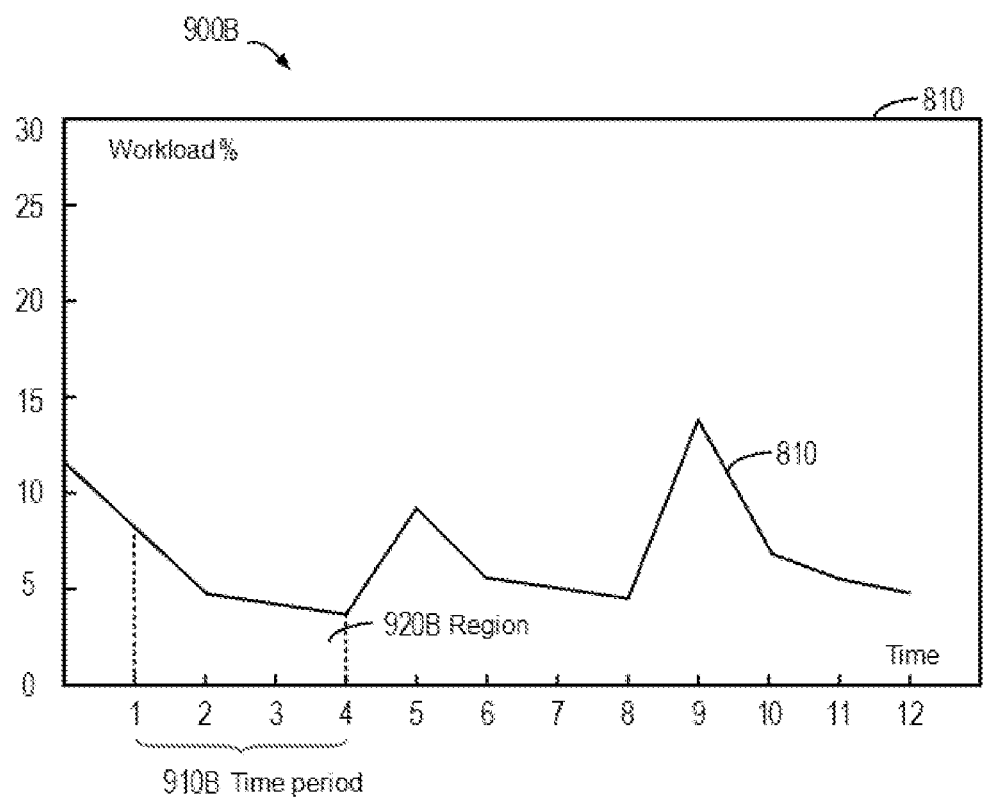

FIG. 9B schematically shows block diagram 900B of selecting a target time period according to an example implementation of the present disclosure. As shown in FIG. 9B, the length of time is 3 hours, and a sliding window with a width of 3 hours may be set. During the movement of the sliding window, it may be determined that region 920B is minimum, and thus time period 910B (the 1st hour to the 4th hour) corresponding to region 920B may be determined as the target time period. Then, the computing resource may be instructed to process the task from the 1st hour to the 4th hour in the future.

With an example implementation of the present disclosure, a target time period with the lowest workload may be selected from the future time period according to the workload curve. In this way, tasks can be completed faster and task processing performance can be improved.

According to an example implementation of the present disclosure, a user of application system 130 may sign a user service agreement with storage system 110 to specify a response time of storage system 110 to a task from application system 130. A time range for completing the task may be determined based on the user service agreement. At this moment, the target time period may be selected from a part of the future time period within the time range. Continuing to refer to the example of FIG. 9A, it is assumed that the user service agreement specifies that the task needs to be completed within 6 hours. Since optimal time period 910A is within the range of 6 hours, the task may be processed in time period 910A. It is assumed that the user service agreement specifies that the task needs to be completed within 3 hours. Since optimal time period 910A is beyond the range of 3 hours, the target time period with the lowest workload may be selected within the range of 3 hours. For example, it may be selected that the task is processed from the 2nd hour to the 3rd hour.

It will be understood that after a specific target time period has been allocated for processing a task, the task processing will increase the workload of the computing resource within the specific target time period, and therefore the specific target time period is no longer suitable for processing other tasks. According to an example implementation of the present disclosure, the specific target time period may be marked as unavailable. When the storage system receives another processing request for processing another task using the computing resource, the target time period may be selected from other time periods that have not been marked.

Specifically, another length of time required for processing another task may be determined based on a usage state of the computing resource. Then, based on the workload, another target time period matching the another length of time may be selected from a part in the future time period other than the selected target time period. Continuing to refer to FIG. 9B, it is assumed that another task requires 2 hours. Although time period 910B is the target time period with the lowest workload, the time period has already been used, so it is necessary to select a target time period of 2 hours from other unused time periods. For example, the 6th hour to the 8th hour may be selected. Then, the computing resource may be instructed to process another task between the 6th hour and the 8th hour.

With an example implementation of the present disclosure, the workloads of the computing resource generated for processing a data access request and for processing a task may be considered respectively. In this way, the target time period with the lowest workload may be selected to process the task, thereby improving task processing efficiency and reducing the impact of the task on the own work of the storage system.

An example of the method according to the present disclosure has been described in detail above with reference to FIGS. 2 to 9B, and implementations of a corresponding apparatus will be described below. According to an example implementation of the present disclosure, an apparatus for managing a computing resource in a storage system is provided. The apparatus includes: a receiving module, configured to receive a processing request for processing a task using a computing resource; an acquisition module, configured to acquire, based on a usage state of the computing resource, a length of time required for processing the task; a determination module, configured to determine, based on a load model of the computing resource and a current workload of the computing resource, a workload of the computing resource for processing a future data access request for the storage system within a future time period, the load model describing an association relationship between a previous load and a subsequent load of the computing resource for processing a historical data access request for the storage system; and a selection module, configured to select, based on the workload, a target time period matching the length of time from the future time period for processing the task. According to an example implementation of the present disclosure, the apparatus further includes modules for performing other steps in the method described above.

Figure 10:
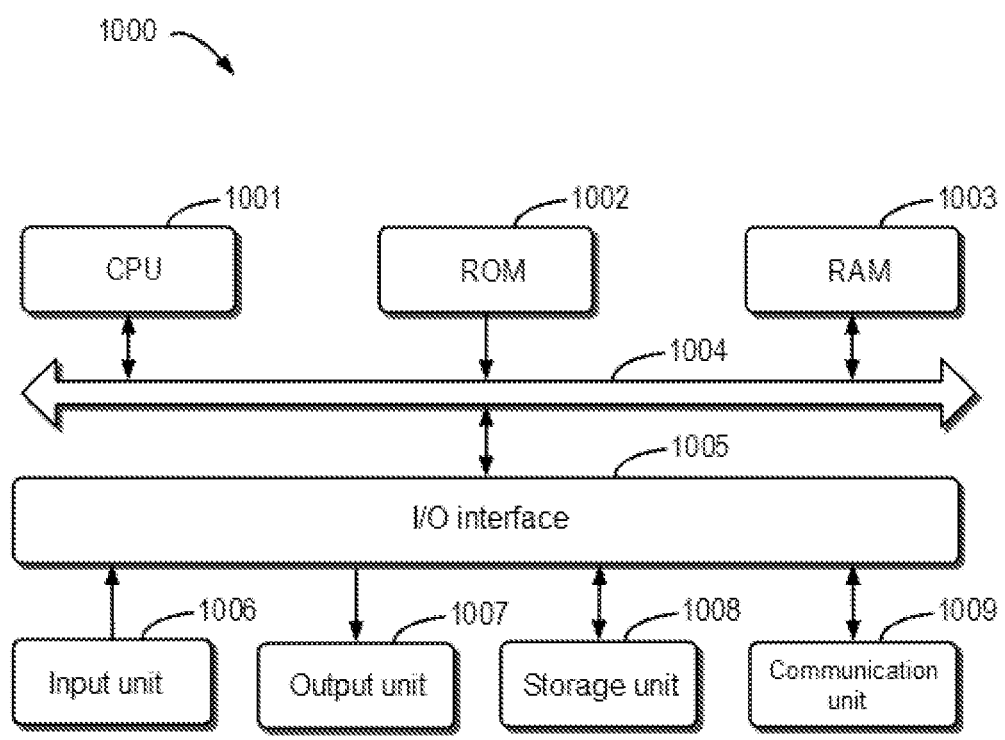
FIG. 10 schematically shows a block diagram of a device for managing a computing resource in a storage system according to an example implementation of the present disclosure.

FIG. 10 schematically shows a block diagram of device 1000 for managing a computing resource in a storage system according to an example implementation of the present disclosure. As shown in the figure, device 1000 includes CPU 1001 that may perform various appropriate actions and processing according to computer program instructions stored in read-only memory (ROM) 1002 or computer program instructions loaded from storage unit 1008 into random access memory (RAM) 1003. In RAM 1003, various programs and data required for the operation of device 1000 may also be stored. CPU 1001, ROM 1002, and RAM 1003 are connected to each other via bus 1004. Input/output (I/O) interface 1005 is also connected to bus 1004.

A plurality of components in device 1000 are connected to I/O interface 1005, including: input unit 1006, such as a keyboard and a mouse; output unit 1007, such as various types of displays and speakers; storage unit 1008, such as a magnetic disk and an optical disc; and communication unit 1009, such as a network card, a modem, and a wireless communication transceiver. Communication unit 1009 allows device 1000 to exchange information/data with other devices over a computer network such as the Internet and/or various telecommunication networks.

The processes and processing described above, such as method 300, may be performed by processing unit 1001. For example, in some implementations, method 300 may be implemented as a computer software program that is tangibly included in a machine-readable medium, such as storage unit 1008. In some implementations, some or all of the computer program may be loaded and/or installed onto device 1000 via ROM 1002 and/or communication unit 1009. When the computer program is loaded to RAM 1003 and executed by CPU 1001, one or more steps of method 300 described above may be performed. Alternatively, in other implementations, CPU 1001 may also be configured in any other suitable manner to implement the above-mentioned processes/methods.

According to an example implementation of the present disclosure, an electronic device is provided. The electronic device includes: at least one processor; a volatile memory; and a memory coupled to the at least one processor. The memory has instructions stored therein. When executed by the at least one processor, the instructions cause the device to execute actions for managing a computing resource in a storage system. The actions include: receiving a processing request for processing a task using a computing resource; acquiring, based on a usage state of the computing resource, a length of time required for processing the task; determining, based on a load model of the computing resource and a current workload of the computing resource, a workload of the computing resource for processing a future data access request for the storage system within a future time period, the load model describing an association relationship between a previous load and a subsequent load of the computing resource for processing a historical data access request for the storage system; and selecting, based on the workload, a target time period matching the length of time from the future time period for processing the task.

According to an example implementation of the present disclosure, selecting the target time period includes: generating a workload curve describing an association relationship between the workload and a time point in the future time period; and selecting, based on the workload curve, the target time period from the future time period.

According to an example implementation of the present disclosure, selecting the target time period based on the workload curve includes: establishing a sliding window based on the length of time; and determining the target time period based on the sliding window and the workload curve during the movement of the sliding window along a time axis of the workload curve.

According to an example implementation of the present disclosure, determining the target time period includes: determining a region between the workload curve and the time axis and within the sliding window; and determining the target time period based on a size of the region.

According to an example implementation of the present disclosure, selecting the target time period further includes: determining a time range for completing the task; and selecting the target time period from a part of the future time period within the time range.

According to an example implementation of the present disclosure, the actions further include: receiving another processing request for processing another task using the computing resource; determining, based on the usage state, another length of time required for processing the another task; selecting, based on the workload, another target time period matching the another length of time from a part in the future time period other than the target time period; and instructing the computing resource to process the another task within the another target time period.

According to an example implementation of the present disclosure, the actions further include: acquiring a historical load sequence of the computing resource within a historical time period; and training the load model based on the historical load sequence.

According to an example implementation of the present disclosure, training the load model based on the historical load sequence includes: selecting a plurality of historical load segments from the historical load sequence; determining, in the historical load sequence, a plurality of future load fragments respectively corresponding to the plurality of historical load fragments, a future load fragment in the plurality of future load fragments following a historical load fragment in the plurality of historical load fragments; and training the load model based on the plurality of historical load fragments and the plurality of future load fragments, so that a predicted value of a future load obtained based on the historical load fragment and the trained load model is consistent with the future load fragment.

According to an example implementation of the present disclosure, selecting the plurality of historical load segments from the historical load sequence includes: selecting the plurality of historical load segments from the historical load sequence based on a predetermined length of the historical load segment; and determining the plurality of future load fragments respectively corresponding to the plurality of historical load fragments includes: determining the plurality of future load segments respectively corresponding to the plurality of historical load segments based on a predetermined length of the future load segment.

According to an example implementation of the present disclosure, the storage system includes a backup system.

According to an example implementation of the present disclosure, a computer program product is provided. The computer program product is tangibly stored on a non-transitory computer-readable medium and includes machine-executable instructions that are used to perform the method according to the present disclosure.

According to an example implementation of the present disclosure, a computer-readable medium is provided. The computer-readable medium stores machine-executable instructions that, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein may be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be completely executed on a user's computer, partially executed on a user's computer, executed as a separate software package, partially executed on a user's computer and partially executed on a remote computer, or completely executed on a remote computer or a server. In cases where a remote computer is involved, the remote computer may be connected to a user's computer over any kind of networks, including a local area network (LAN) or a wide area network (WAN), or may be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to implementations of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or another programmable data processing apparatus, produce a means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flowcharts and/or block diagrams.

The computer-readable program instructions may also be loaded onto a computer, another programmable data processing apparatus, or another device, so that a series of operating steps may be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of systems, methods, and computer program products according to multiple implementations of the present disclosure. In this regard, each block in the flowcharts or block diagrams may represent a module, a program segment, or a part of an instruction that contains one or more executable instructions for implementing specified logical functions. In some alternative implementations, functions labeled in the blocks may also occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various implementations of the present disclosure have been described above. The above description is illustrative but not exhaustive, and is not limited to the various implementations disclosed. Many modifications and variations will be apparent to those of ordinary skill in the art without departing from the scope and spirit of the illustrated various implementations. The selection of terms as used herein is intended to best explain the principles and practical applications of the various implementations or the improvements to technologies on the market, or to enable other persons of ordinary skill in the art to understand the implementations disclosed here.

The invention claimed is:

1. A method for managing a computing resource in a storage system, comprising:
   receiving a processing request for processing a task using the computing resource;
   acquiring, based on a usage state of the computing resource, a length of time required for processing the task;
   determining, based on a load model of the computing resource and a current workload of the computing resource, a future workload prediction of the computing resource for processing a future data access request for the storage system within a future time period, the load model describing an association relationship between a previous load and a subsequent load of the computing resource for processing a historical data access request for the storage system;
   generating a workload curve describing an association relationship between the future workload prediction and a time point in the future time period;
   selecting a target time period in the future workload prediction that corresponds to a reduced workload, on the workload curve, of the computing resource within the future time period and matches the length of time required for the processing of the task, wherein selecting the target time period based on the workload curve comprises:
      establishing a sliding window based on the length of time; and
      determining the target time period based on the sliding window and the workload curve during movement of the sliding window along a time axis of the workload curve; and
   processing the task using the computing resource according to the target time period.

2. The method according to claim 1, wherein determining the target time period comprises:
   determining a region between the workload curve and the time axis and within the sliding window; and
   determining the target time period based on a size of the region.

3. The method according to claim 1, wherein selecting the target time period further comprises:
   determining a time range for completing the task; and
   selecting the target time period from a part of the future time period within the time range.

4. The method according to claim 1, further comprising:
   receiving another processing request for processing another task using the computing resource;
   determining, based on the usage state, another length of time required for processing the another task;
   selecting, based on the future workload prediction, another target time period matching the another length of time from a part of the future time period other than the target time period; and
   instructing the computing resource to process the another task within the another target time period.

5. The method according to claim 1, further comprising:
   acquiring a historical load sequence of the computing resource within a historical time period; and
   training the load model based on the historical load sequence.

6. The method according to claim 5, wherein training the load model based on the historical load sequence comprises:
   selecting a plurality of historical load segments from the historical load sequence;
   determining, in the historical load sequence, a plurality of future load segments respectively corresponding to the plurality of historical load segments, wherein a future load segment in the plurality of future load segments follows a historical load segment in the plurality of historical load segments; and
   training the load model based on the plurality of historical load segments and the plurality of future load segments, so that a predicted value of a future load obtained based on the historical load segment and the trained load model is consistent with the future load segment.

7. The method according to claim 6, wherein selecting the plurality of historical load segments from the historical load sequence comprises:
   selecting the plurality of historical load segments from the historical load sequence based on a predetermined length of the historical load segment; and
   determining the plurality of future load segments respectively corresponding to the plurality of historical load segments comprises:
      determining the plurality of future load segments respectively corresponding to the plurality of historical load segments based on a predetermined length of the future load segment.

8. The method according to claim 1, wherein the storage system comprises a backup system.

9. An electronic device, comprising:
   at least one processor; and
   a memory coupled to the at least one processor and having instructions stored therein, which when executed by the at least one processor, cause the at least one processor to perform actions for managing a computing resource in a storage system, the actions comprising:
      receiving a processing request for processing a task using the computing resource;
      acquiring, based on a usage state of the computing resource, a length of time required for processing the task;
      determining, based on a load model of the computing resource and a current workload of the computing resource, a future workload prediction of the computing resource for processing a future data access request for the storage system within a future time period, the load model describing an association relationship between a previous load and a subsequent load of the computing resource for processing a historical data access request for the storage system;
      generating a workload curve describing an association relationship between the future workload prediction and a time point in the future time period;
      selecting a target time period in the future workload prediction that corresponds to a reduced workload, on the workload curve, of the computing resource within the future time period and matches the length of time required for the processing of the task, wherein selecting the target time period based on the workload curve comprises:
         establishing a sliding window based on the length of time; and
         determining the target time period based on the sliding window and the workload curve during movement of the sliding window along a time axis of the workload curve; and processing the task using the computing resource according to the target time period.

10. The device according to claim 9, wherein determining the target time period comprises:

determining a region between the workload curve and the time axis and within the sliding window; and determining the target time period based on a size of the region.

11. The device according to claim 9, wherein selecting the target time period further comprises:

determining a time range for completing the task; and selecting the target time period from a part of the future time period within the time range.

12. The device according to claim 9, wherein the actions further comprise:

receiving another processing request for processing another task using the computing resource;

determining, based on the usage state, another length of time required for processing the another task;

selecting, based on the future workload prediction, another target time period matching the another length of time from a part of the future time period other than the target time period; and instructing the computing resource to process the another task within the another target time period.

13. The device according to claim 9, wherein the actions further comprise:

acquiring a historical load sequence of the computing resource within a historical time period; and training the load model based on the historical load sequence.

14. The device according to claim 13, wherein training the load model based on the historical load sequence comprises:

selecting a plurality of historical load segments from the historical load sequence;

determining, in the historical load sequence, a plurality of future load segments respectively corresponding to the plurality of historical load segments, wherein a future load segment in the plurality of future load segments follows a historical load segment in the plurality of historical load segments; and training the load model based on the plurality of historical load segments and the plurality of future load segments, so that a predicted value of a future load obtained based on the historical load segment and the trained load model is consistent with the future load segment.

15. The device according to claim 14, wherein selecting the plurality of historical load segments from the historical load sequence comprises:

selecting the plurality of historical load segments from the historical load sequence based on a predetermined length of the historical load segment; and determining the plurality of future load segments respectively corresponding to the plurality of historical load segments comprises:

determining the plurality of future load segments respectively corresponding to the plurality of historical load segments based on a predetermined length of the future load segment.

16. A computer program product tangibly stored on a non-transitory computer-readable medium and comprising machine-executable instructions, which when executed by a processor, cause the processor to perform actions, the actions comprising:

receiving a processing request for processing a task using a computing resource;

acquiring, based on a usage state of the computing resource, a length of time required for processing the task;

determining, based on a load model of the computing resource and a current workload of the computing resource, a future workload prediction of the computing resource for processing a future data access request for a storage system within a future time period, the load model describing an association relationship between a previous load and a subsequent load of the computing resource for processing a historical data access request for the storage system;

generating a workload curve describing an association relationship between the future workload prediction and a time point in the future time period;

selecting a target time period in the future workload prediction that corresponds to a reduced workload, on the workload curve, of the computing resource within the future time period and matches the length of time required for the processing of the task, wherein selecting the target time period based on the workload curve comprises:

establishing a sliding window based on the length of time; and determining the target time period based on the sliding window and the workload curve during movement of the sliding window along a time axis of the workload curve; and processing the task using the computing resource according to the target time period.

17. The computer program product of claim 16, wherein the actions further comprise:

determining a region between the workload curve and the time axis and within the sliding window; and determining the target time period based on a size of the region.

18. The computer program product of claim 16, wherein the actions further comprise:

determining a time range for completing the task; and selecting the target time period from a part of the future time period within the time range.

19. The computer program product of claim 16, wherein the actions further comprise:

receiving another processing request for processing another task using the computing resource;

determining, based on the usage state, another length of time required for processing the another task;

selecting, based on the future workload prediction, another target time period matching the another length of time from a part of the future time period other than the target time period; and instructing the computing resource to process the another task within the another target time period.

20. The computer program product of claim 16, wherein the actions further comprise:

acquiring a historical load sequence of the computing resource within a historical time period; and training the load model based on the historical load sequence.

* * * * *